US007440587B1

(12) United States Patent
Bourdev

(10) Patent No.: US 7,440,587 B1
(45) Date of Patent: Oct. 21, 2008

(54) METHOD AND APPARATUS FOR CALIBRATING SAMPLING OPERATIONS FOR AN OBJECT DETECTION PROCESS

(75) Inventor: Lubomir D. Bourdev, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 589 days.

(21) Appl. No.: 10/997,395

(22) Filed: Nov. 24, 2004

(51) Int. Cl.
*G06K 9/00* (2006.01)
*H04N 5/225* (2006.01)
(52) U.S. Cl. ............... 382/103; 382/118; 348/169
(58) Field of Classification Search ............... 382/103, 382/107, 115, 116, 117, 118, 227, 297, 317; 348/77, 94, 152, 154, 155, 169, 170, 171, 348/172, 208.16, 352, 353, 356
See application file for complete search history.

(56) References Cited

U.S. PATENT DOCUMENTS

| 4,975,969 | A | | 12/1990 | Tal | |
|---|---|---|---|---|---|
| 5,164,992 | A | * | 11/1992 | Turk et al. | 382/118 |
| 5,414,781 | A | | 5/1995 | Spitz et al. | |
| 5,450,504 | A | * | 9/1995 | Calia | 382/118 |
| 5,642,431 | A | * | 6/1997 | Poggio et al. | 382/118 |
| 6,697,103 | B1 | * | 2/2004 | Fernandez et al. | 348/143 |
| 7,274,832 | B2 | * | 9/2007 | Nicponski | 382/297 |
| 2006/0187305 | A1 | * | 8/2006 | Trivedi et al. | 348/169 |

OTHER PUBLICATIONS

P. Viola and M. Jones, "Robust Real-Time Object Detection," ICCV, Cancouver, Canada, 2001.
F. Crow, "Summed Area Tables for Texture Mapping," SIGGRAPH 1984.
H. Rowley, S. Baluja and T. Kanade, "Neural Network-Based Face Detection," In IEEE Pattern Analysis and Machine Intelligence, vol. 20, 1998.
H. Schneiderman, "A Statistical Approach to 3D Object Detection Applies to Faces and Cars," Ph.D. Thesis, CMU, May 2000.
R. Feraud, O. Bernier, J. Viallet, M. Collobert, "A Fast and Accurate Face Detector Based on Neural Networks," IEEE Transactions on Pattern Analysis and Machine Intelligence, vol. 23, Jan. 2001.
B. Heisele, T. Serre, S. Prentice, T. Poggio, "Hierarchical Classification and Feature Reduction for Fast Face Detection with Support Vector Machines," Pattern Recognition 36, 2003.

(Continued)

*Primary Examiner*—Abolfazl Tabatabai
(74) *Attorney, Agent, or Firm*—Robert C. Kowert; Meyertons, Hood, Kivlin, Kowert & Goetzel, P.C.

(57) ABSTRACT

One embodiment of the present invention provides a system that detects an object in an image. During operation, the system determines a relationship between sampling parameters and a detection rate for an object detection process. The system also determines a relationship between the sampling parameters and a detection speed for the object detection process. The system uses the determined relationships to generate specific sampling parameters. Next, the system performs the object detection process, wherein the object detection process uses the sampling parameters to sample locations in the image. This sampling process is used to refine the search for the object by identifying locations that respond to an object detector and are hence likely to be proximate to an instance of the object.

21 Claims, 4 Drawing Sheets

OTHER PUBLICATIONS

B. Scassellati, "Eye Finding via Face Detection for a Foveated, Active Vision System," Proceedings of 15th National Conference of Artificial Intelligence, 1998.

H. Sahbi, N. Boujemmaa, Coarse-to-Fine Support Vector Classifiers for Face Detection, ICPR 2002.

A. Rosenfeld, G.J. Vanderbrug, "Coarse-Fine Template Matching," IEEE Trans. Syst. Man Cybernet. 2, 1997.

J. Edwards, H. Murase, "Appearance Matching of Occluded Objects Using Coarse-to-Fine Adaptive Masks," CVPR, 1997.

H. Schneiderman, T. Kanade, "Object Detection Using the Statistics of Parts," International Journal of Computer Vision, 2002.

Z. Sun, G. Bebis, R. Miller, "Quantized Wavelet Features and Support Vector Machines for On-Road Vehicle Detection," Seventh International Conference on Control, Automation, Robotics and Vision, 2002.

M. Yang, D. Kriegman, N. Ahuja, "Detecting Faces in Images: A Survey," IEEE Transactions on Pattern Analysis and Machine Intelligence, vol. 24, 2002.

Lubomir Bourdev, Adobe Systems, "Improving the speed of object detection in images by calibrating the scanning function", 7 pages.

P. Viola and M. Jones, "Robust Real-time Object Detection," ICCV, Vancouver, Canada, 2001, 25 pages.

"Summed area tables for texture mapping", SIGGRAPH 1984, vol. 18, No. 3, 6 pages.

"Neural Network-based face detection", In IEEE Pattern analysis and machine intelligence, vol. 20, No. 1, Jan. 1998, 16 pages.

* cited by examiner

METHOD AND APPARATUS FOR CALIBRATING SAMPLING OPERATIONS FOR AN OBJECT DETECTION PROCESS

BACKGROUND

1. Field of the Invention

The present invention relates to techniques for detecting objects within images. More specifically, the present invention relates to a method and an apparatus for calibrating sampling operations during an object detection process.

2. Related Art

As computer systems are becoming more powerful, they are being used for increasingly computationally intensive tasks involving large images. One such task is "object detection." The goal of object detection is to determine the presence and location of objects of a given type (such as faces) within a digital image. Typically, object detection begins by training a classifier (an object detector) to recognize the presence of the object of interest within a two-dimensional window of a suitable aspect ratio. The goal of object detection, as of any search problem, is to find the local minima in the detector's response function, which have a response above a given acceptance threshold.

Traditional search methods, such as gradient descent and the simplex method, cannot be applied for this search problem because the surface of the detector response function is flat (except for noise) for any subwindow located away from the object. Therefore, the common approach to object detection is a brute-force search of every subwindow in the image, at every scale in a pre-defined set of scales, and sometimes every rotation in a pre-defined set of rotations. For example, the detector may be trained to determine whether a given 20×20 window of grayscale pixels represents a low resolution frontal view of a human face. To determine whether a digital image contains a face, the detector can be applied to every 20×20 scan window in an image, so that it can take into account a comprehensive set of positions, scales and orientations.

Although the above-described approach is guaranteed to find all occurrences of the object that the detector is able to recognize, it can be prohibitively time consuming for many applications.

Furthermore, some applications can only devote fixed amount of time per image, such as video surveillance systems that provide real-time image analysis. These applications try to do the best they can while keeping up with the frame rate. Other applications can take more time, but need the best intermediate results, such as a computer-assisted person tagging system, in which the user can start correcting the tag assignments before the system has analyzed all images in full. Hence, in some cases comprehensive detection may take more time than the system can allow, and in other cases it is better for the system to spend more time in the hope of finding more instances of the object. Unfortunately, the speed/detection rate tradeoff is hard-coded in traditional systems and cannot be changed dynamically.

Hence, what is needed is a method and an apparatus for detecting an object within an image without the above-described problems.

SUMMARY

One embodiment of the present invention provides a system that detects an object in an image. During operation, the system determines a relationship between sampling parameters and a detection rate for an object detection process. The system also determines a relationship between the sampling parameters and a detection speed for the object detection process. The system uses the determined relationships to generate specific sampling parameters. Next, the system performs the object detection process, wherein the object detection process uses the sampling parameters to sample locations in the image. This sampling process is used to refine the search for the object by identifying locations that respond to an object detector and are hence likely to be proximate to an instance of the object.

In a variation on this embodiment, generating the specific sampling parameters involves maximizing detection speed for a fixed detection rate.

In a variation on this embodiment, generating the specific sampling parameters involves maximizing detection rate for a fixed detection speed.

In a variation on this embodiment, the sampling parameters include a sampling function, which determines locations within the image to sample. The sampling parameters also include a refinement threshold. If a response obtained while sampling a given location exceeds the refinement threshold, a localized search for the object is performed in the vicinity of the given location.

In a further variation, during the object detection process, the system uses the sampling function to identify locations in the image to sample. Then, the system applies the object detector to the identified locations. If the object detector's response at a given location exceeds the refinement threshold, the system refines the search by attempting to locate a perfect center for the object in the vicinity of the given location.

In a further variation, the sampling function is determined based upon empirical results obtained while using the object detector.

In a further variation, the refinement threshold is determined based upon empirical results obtained while using the object detector.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as a LAN, a WAN, or the Internet.

Object Detection

One embodiment of the present invention provides a technique that improves the speed of object detection in digital images, which uses any given pre-trained detector, while maintaining a target detection rate. Using this technique to calibrate a conventional system can result in performance which is comparable to that of the fastest reported detectors. An alternative embodiment, (also described in this specification), facilitates maximizing the detection rate for a given target detection speed.

Figure 2:
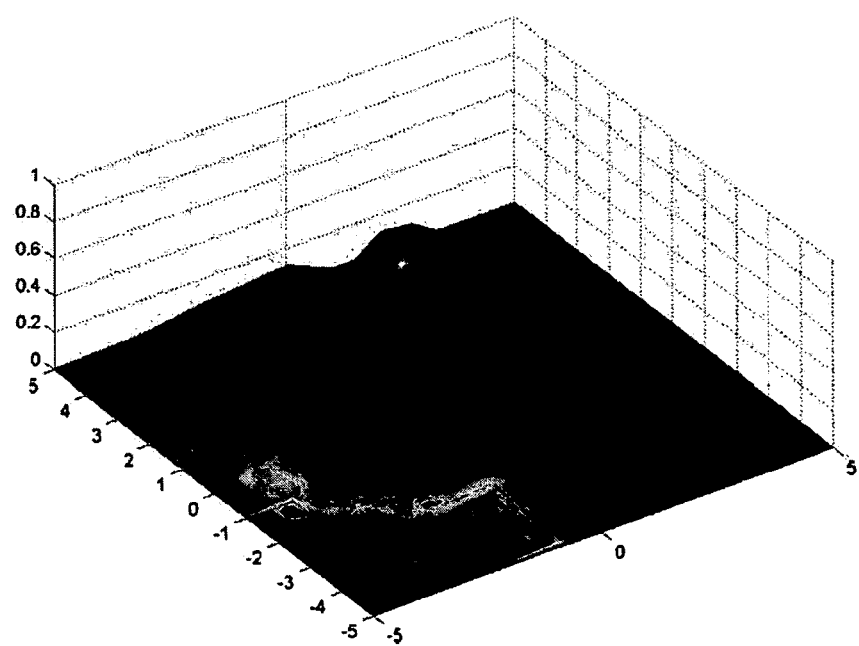
FIG. 2 illustrates an example of a valley in a detector's response surface corresponding to an object in an image in accordance with an embodiment of the present invention.

One of the main ideas behind the present invention is that the valley in the detector's response function corresponding to the presence of the object in the image has certain expected dimensions, which are specific to the trained detector (see FIG. 2).

FIG. 2 presents an example of a valley in a detector's response surface corresponding to an object in an image. The light-grey surface is the average detector's response for any offset from the object's center. The dark-grey plane is the average response when the detector is applied away from the object. This figure illustrates a two-dimensional search space, wherein the two dimensions are X and Y offsets between the detector and the object's center. However, note that in general the search space can have more than two dimensions. For example, the search space can additionally have dimensions for scale and rotation.

Figure 1:
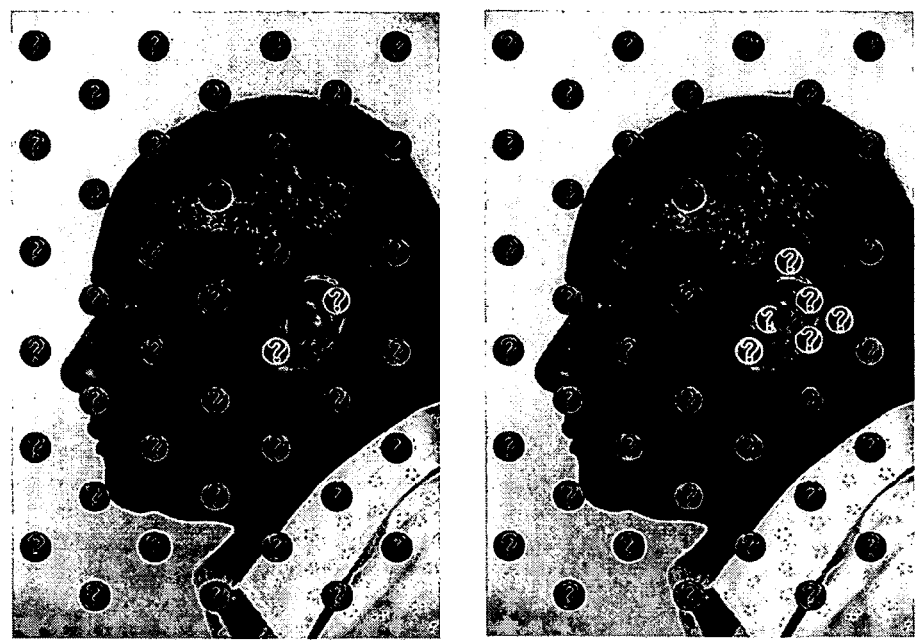
FIG. 1 illustrates an example of calibrated scanning in accordance with an embodiment of the present invention.

We can afford to sample fewer points in the search space (by using a sampling function), as long as we sample densely enough as to not miss a valley of such dimensions (see FIG. 1). Once we hit a valley (i.e. once the detector's response is higher than t, a refinement threshold), we can use a modified version of the simplex method or other traditional function optimization methods to refine the search and locate the local minimum (i.e. the center of the object). For example, FIG. 1 illustrates an example of calibrated scanning. In FIG. 1, we sample the search space at pre-determined spacing in X, Y, Scale and Rotation. Once we find a promising area, we narrow it down to the center of the object.

The sampling function and the refinement threshold affect the speed and detection rate of the search. If we use a dense sampling function, we have a higher chance of hitting the valley of an object and thus higher detection rate, but we would have to sample more points in the search space which translates to slower detection. Similarly, if we use a low refinement threshold, we would have a better detection rate (because even hits on the fringe of the valley, where the response is small, will be explored) but we would perform more refinements which are expensive and result in slower detection.

DEFINITIONS

Let W and H be positive integers defining a two-dimensional window of fixed size. Let U be the space of all subwindows with aspect ratio W/H in all images. The dimensions of U are implementation-dependent and may include the image, the x and y coordinates within the image, the scale, and the orientation. This general definition of U simplifies the notation and allows us to refer to any subwindows (training examples, test examples, places where we search for the object, etc.) simply as points in U. In this specification we consider only a space with finite and discrete dimensions.

Every point in U corresponds to a subwindow in an image, and therefore to a set of pixels in an image. We call two points in U related if there are pixels covered by the subwindows of both points. Thus related points in U must be from the same image and fairly close to each other (depending on the scale and position of their subwindows). Every point in U is related to itself.

Related: $U,U \rightarrow \rightarrow \{true, false\}$

Throughout the specification we use "$P_1+P_2$" and "$P_1-P_2$" where $P_1, P_2 \in U$ to denote relative position of one point to another. This involves addition/subtraction of the corresponding x, y and rotation coordinates and using the ratio of the scales:

$$P_{X1, Y1, R1, S1} - P_{X2, Y2, R2, S2} \Longleftrightarrow P_{X1-X2, Y1-Y2, R1-R2, S1/S2}$$

By $V: U \rightarrow R$ we would denote the "hypervolume" of a point, i.e. the product of all of its coordinates.

The training space $T \in U$ contains a set of points that represent centers the objects used for training the detector. The search space $X \in U$ is the space of all subwindows in all images which we are searching for occurrences of the object of interest. XP is the set of all points representing such occurrences (i.e. centers of objects)

$C \in U$ is the calibration space. It contains a set of N points $CP = \{cp_0 \ldots cp_N\} \in C$ which represent N examples of the object of interest. We will need those objects to calibrate the detector, as described later in the specification.

X, T and C are disjoint subspaces of U. T and C are representative of X.

The object detector $D_{W,H}: U \rightarrow [0;1]$ determines the likelihood of the object of interest being present at a given point in U. The point in U is mapped onto a two-dimensional normalized grid of W by H pixels (translating, scaling, rotating, normalizing the lighting appropriately). This two-dimensional grid is analyzed by the detector to determine the likelihood.

The sampling function $S: X \rightarrow \{true, false\}$ defines a subset of the search space that is tested during the search. For simplicity we will only consider sampling functions that have a repeatable template. They are defined by the size of the template and the set of points in the template that are sampled:

$$S_{DIM, PTS}(x) = \begin{cases} true & if \ (x \ mod \ DIM) \in PTS \\ false & otherwise \end{cases}$$

where $DIM \in U$ is a vector that defines the dimensions of the template (a "hyperbox") and PTS is a set of points $p_i$ inside the template ($p_i < DIM$) that are sampled.

For example, if we restrict ourselves only to the x and y dimension, $S_{(5,10), \{(1,3)\}}$ represents a grid sampling function that samples points with X coordinates 1, 6, 11, 16, ... and Y coordinates 3, 13, 23, 33, ....

Figure 3:
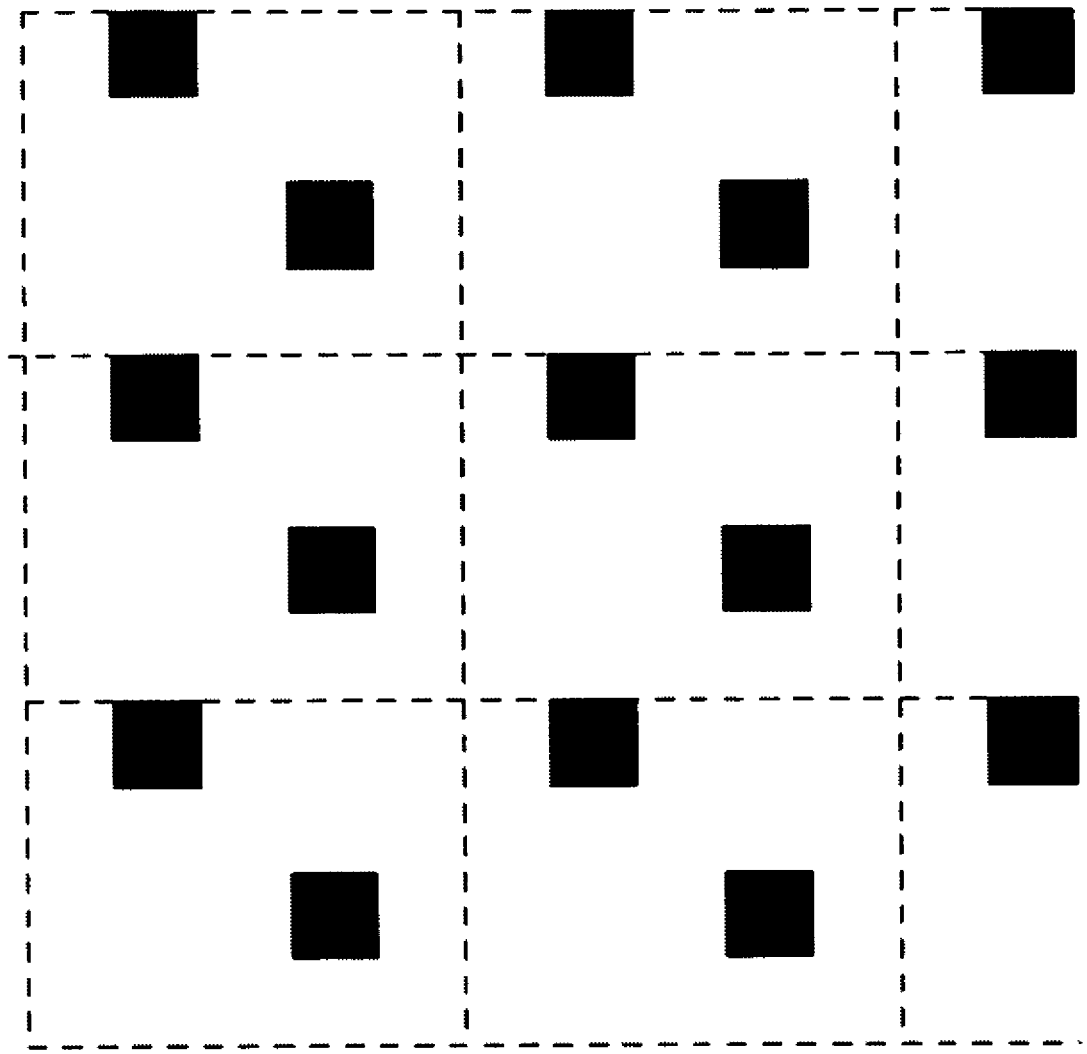
FIG. 3 presents an example of a repeatable sampling function in two dimensions in accordance with an embodiment of the present invention.

$S_{(q,\sqrt{3}*q),\{(0,0),(q/2,\sqrt{3}*q/2)\}}$ defines an equilateral triangular sampling with a triangle size of q. (All coordinates are rounded to integers.) $S_{(1,1,1\ldots),\{(0,0,0\ldots)\}}$ is the brute-force search function traditionally used. FIG. 3 presents another example of a repeatable sampling function in two dimensions, wherein DIM=(5,4) and PTS={(1,0),(3,2)}.

If the detector's response at a given sample is beyond the refinement threshold t, we assume we are in a valley and search for the local minimum of the valley (refine the location).

Relationship Between the Sampling Parameters and Detection Rate

In this section we determine how the choice of sampling function $S_{DIM,PTS}$ and refinement threshold t relate to the probability of missing an object, PM.

Let $P_{MISS}(dx, t)$ be the probability that the detector applied at an offset dx from the center xp of any object in the test set will have a response less than t:

$$P_{MISS}(dx,t)=P(D(xp+dx)<t|xp\epsilon XP)$$

We don't know this function but we can estimate it by observing the detector response when applied at an offset dx from the center $cp_i$ of every object in the calibration set. It is simply the fraction of the calibration examples that give a response less that t over N, the total number of calibration examples:

$$H(t, r) = \begin{cases} 1 & \text{if } t \geq r \\ 0 & \text{otherwise} \end{cases}$$

$$P_{MISS}(dx, t) \approx P'_{MISS}(dx, t) = \frac{\sum_i^N (H(t, D(cp_i + dx)))}{N}$$

We have estimated the probability of missing the object if we sample at a single offset dx from its center. The sampling function, however, may result in multiple samples within the valley of the object. We will miss the object only if the response at each of them is less than t. If the responses at each sample were uncorrelated, computing the final probability would be as simple as multiplying them all together. Unfortunately, they tend to be highly correlated, so to estimate the probability of missing an object given a set $DX=\{dx_1 \ldots dx_m\}$ of sample offsets from the center of an object we have to compute the fraction of calibration objects sampled at those points that have a response less than t in all samples:

$$P_{MISS}(DX,t) \approx P(D(xp+dX_1)<t \wedge \ldots \wedge D(xp+dx_m)<t)$$

$$P_{MISS}(DX, t) \approx P'_{MISS}(DX, t) = \frac{\sum_i \prod_j (H(t, D(cp_i + dx_j)))}{N}$$

The above estimate requires a significant number of calibration examples to be accurate, since, for a very small t, there could be no calibration examples which are missed by all samples. In this case our estimate of $P_{MISS}(DX,t)$ would be 0, which is an underestimate. We can improve the estimate by replacing the hard threshold function H(x) with a smoother version, for example with a sigmoid:

$$H(t,r)=1/(1+e^{k(r-t)/r})$$

where k>0 is a constant that determines the "hardness" of the threshold. It should be set proportional to N, the size of the calibration set.

Now we need to determine the actual points in the valley of the object that would be sampled by S, i.e. the set of offsets DX. That set depends on the nature of S, as well as on the offset of the object with respect to the sampling function's template.

Consider an object from the test set whose center is at $xp \epsilon XP$ and its offset from the sampling function's template is ox (ox<DIM). Let:

$$DX(S_{DIM,PTS},ox)=\{xp-\forall x \epsilon X, (\text{related}(x,xp) \wedge S_{DIM,PTS}(x-ox))\}$$

Figure 4:
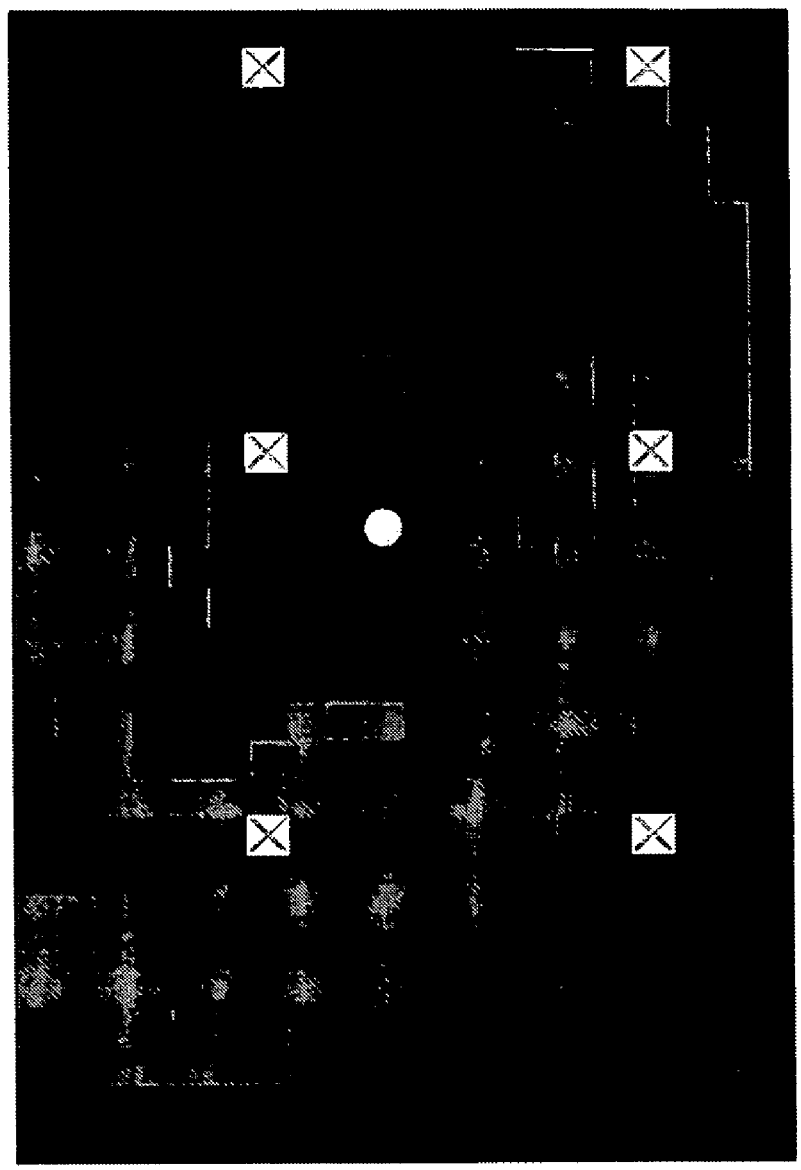
FIG. 4 presents an example of a two-dimensional sampling function applied to a valley of an object in accordance with an embodiment of the present invention.

In words $DX(S_{DIM,PTS},ox)$ is the set of all points in the valley of the object centered at xp that are sampled by S assuming the object is offset by ox from the sampling function's template. The points are also transformed to the coordinate system of the object. See FIG. 4 which presents an example of a two-dimensional sampling function $S_{(10,10),\{(0,0)\}}$ applied in the valley of an object. In FIG. 4, the circle indicates xp, the object's center, the object is offset by (3,2) from the sampling function's template, so ox=(3,2), and the sampled points in the object's space are $$DX(S_{(10,10),\{(0,0)\}},(3,2))=\{(-3,-12),(7,-12),(-3,-2),(7,-2),(-3,8),(7,8)\}.$$

The probability of missing this object is:

$$PM(S_{DIM,PTS},ox,t)=P_{MISS}(DX(S_{DIM,PTS},ox),t)$$

The object could be at any offset ox from the template of the sampling function. Assuming uniform distribution, any offset is equally likely, so the probability of missing the object is:

$$PM(S_{DIM,PTS}, t) = \sum_{\forall ox \in DIM} PM(S_{DIM,PTS}, ox, t)P(ox)$$

$$PM(S_{DIM,PTS}, t) = \frac{1}{V(DIM)} \sum_{\forall ox \in DIM} PM(S_{DIM,PTS}, ox, t)$$

$$PM(S_{DIM,PTS}, t) = \frac{1}{V(DIM)} \sum_{\forall ox \in DIM} P_{MISS}(DX(S_{DIM,PTS}, ox), t)$$

where V(DIM) is number of all possible offsets ox<DIM, which is the "hypervolume" of the "hyperbox" of the sampling function's template—i.e., the product of all of its dimensions.

Relationship Between the Sampling Parameters and Detection Speed

In this section we determine how the choice of sampling function $S_{DIM,PTS}$ and refinement threshold t relate to the frequency of invoking the detector, FD, which is usually linear to the time for completing the detection process.

The detector is evaluated in two scenarios: (1) once at every point selected by the sampling function; and (2) multiple times during the refinement process at every point of scenario 1 with response greater than t.

We can compute the frequency of the first scenario as the ratio of points the sampling function selects within its template:

$$F_S(S_{DIM,PTS}) = \frac{|PTS|}{V(DIM)}$$

where |PTS| is the number of points selected in each template of the sampling function and V(DIM) is the total number of points in each template.

The second scenario, refinement, happens only if the response at a sample point is greater than t. We can use the calibration space to estimate the probability of this event via Monte-Carlo sampling:

$$P_{refine}(t) = P(D(x) > t \mid x \in X) \approx \frac{1}{Nt} \sum^{Nt} H(D(Rand(C), t))$$

where R and (C) is a point in the calibration space C drawn at random with uniform distribution. It is important that the calibration space be representative of the search space in terms of the frequency and size of objects, as well as the characteristics of the non-object areas.

Nt is the number of random samples necessary for accurate estimate of $F_R$. According to the Central Limit Theorem, for large values of Nt our estimate approaches the mean of a normal distribution. Furthermore, the standard error of the estimate decreases as the square root of Nt, which provides a nice advantage of Monte-Carlo methods for statistical analysis of high dimensional probability distributions such as this one. The frequency of applying the detector during refinement is:

$$F_R(t) = P_{Refine}(t) NumDR$$

Where NumDR is the average number of detector evaluations for a single refinement. It depends on the refinement algorithm and is again estimated in a similar way. The total detection frequency is the sum of both frequencies:

$$FD(S_{DIM,PTS}) = F_S(S_{DIM,PTS}) + F_R(t)$$

Maximizing Detection Speed for a Given Minimum Detection Rate

We have derived the relationships that tie the refinement threshold t, and the sampling function parameters DIM and PTS to the probability of missing an object and to the detection time. Now we need to determine the optimal values of DIM, PTS and t, so that detection time is minimized while maintaining a specified high detection rate.

We will restrict our analysis to triangular sampling functions because they can cover the search space with a minimum number of samples while ensuring a given maximum distance from any point in the search space to a sampled point (in the case of equilateral triangles or "hyperpyramids" in higher dimensions). However, the analysis can be applied in analogous way to any other type of repeatable sampling function.

Triangular sampling functions sample two points in their template, one in a corner and one in the center, i.e. they have the form $S_{DIM,\{0,DIM/2\}}$.

In this simplified form, the problem is to determine the values of t and DIM that minimize detection time while keeping detection miss probability less than ρ.

For a given value of DIM, we can determine the maximum value of t for which the detection miss probability is less than ρ:

$$t_{DIM} = \underset{t_i}{\mathrm{argmax}}(PM(S_{DIM,\{0,DIM/2\}}, t_i) < \rho)$$

We know that the refinement threshold is proportional to the miss probability PM, so we can use the bisection method to quickly converge to the value of $t_{DIM}$.

For a given DIM and $t_{DIM}$, we can determine the estimated detection frequency as $FD(S_{DIM,\{0,DIM/2\}}, t_{DIM})$. We want to pick the value of DIM that minimizes that frequency. So the final formulas are:

$$DIM = \underset{DIM_j}{\mathrm{argmin}}\left(FD\left(S_{DIM_j,\{0,DIM_j/2\}}, \underset{t_i}{\mathrm{argmax}}(PM(S_{DIM_j,\{0,DIM_j/2\}}, t_i) < \rho)\right)\right)$$

$$t = \underset{t_i}{\mathrm{argmax}}(PM(S_{DIM,\{0,DIM/2\}}, t_i) < \rho)$$

$$PTS = \{0, DIM/2\}$$

We can restrict our search for the optimal template dimensions DIM by observing that the $DIM_X$ and $DIM_Y$ must be small enough so that there is at least one (and, in practice, a lot more than one) sample in the valley of an object. Similarly, the dimensions must be large enough so that there is not more than one sample per pixel. Specifically:

$DIM_{SCALE} \geq 1$ $DIM_X \in [1/DIM_{SCALE}, W/DIM_{SCALE}]$ $DIM_Y \in [1/DIM_{SCALE}, H/DIM_{SCALE}]$ Another method of restricting the search is by using the following relationship:

$F_S(S_{DIM1, PTS}) < F_S(S_{DIM2, PTS})$ and $t1 > t2$ ⟺

$F_S(S_{DIM1, PTS}) < F_S(S_{DIM2, PTS})$ and $F_R(t1) < F_R(t2)$ ⟺

$FD(S_{DIM1, PTS}, t1) < FD(S_{DIM2, PTS}, t2)$

Thus, during calibration we can keep track of the highest found refinement threshold $t_{MAX}(f)$ for any function whose frequency $F_S$ is equal to or less than f and ignore from consideration any sampling functions $S_{DIM,\{0,DIM/2\}}$ for which:

$$PM(S_{DIM,\{0, DIM/2\}}, t_{MAX}(F_S(S_{DIM,\{0, DIM/2\}}))) < t$$

In addition, there is an optimal ratio of $DIM_X/DIM_Y$ which represents the horizontal vs. vertical offset sensitivity of the detector, or the optimal aspect ratio of the valley. Therefore, once we determine for a given $DIM_X$ the optimum $DIM_Y$, we will know that for another $DIM_X'$ a good $DIM_Y$ to explore would be:

$DIM_Y' = DIM_X'(DIM_Y/DIM_X)$

Maximizing Detection Rate for a Given Detection Speed

In this section we describe a method for maximizing the probability of detecting an object while keeping the frequency of invoking the detector (and therefore the overall detection time) below a given threshold, λ. Such optimization may be used in real-time systems or other interactive environments that can afford to spend only a fixed amount of time per image. As in the previous section, we consider triangular sampling functions though the analysis is equivalent to any other sampling function.

For a given value of DIM we can determine the minimum refinement threshold such that the expected frequency of detection is below the predefined threshold:

$$t_{DIM} = \underset{t_i}{\operatorname{argmax}}(FD(S_{DIM,\{0,DIM/2\}}, t_i) < \lambda)$$

We know that the refinement threshold is inversely proportional to the refinement frequency $F_R$ and therefore to the detection frequency FD, so we can use the bisection method to quickly converge to the value of $t_{DIM}$.

For a given DIM and $t_{DIM}$ we know how to determine the probability of missing an object $PM(S_{DIM,\{0,DIM/2\}}, t_{DIM})$. We want to pick the value of DIM that maximizes this probability. The final formulas are:

$$DIM = \underset{DIM_j}{\operatorname{argmax}}\left(PM\left(S_{DIM,\{0,DIM_j/2\}}, \underset{t_i}{\operatorname{argmin}}(FD(S_{DIM_j,\{0,DIM_j/2\}}, t_i) < \lambda)\right)\right)$$

$$t = \underset{t_i}{\operatorname{argmax}}(FD(S_{DIM,\{0,DIM/2\}}, t_i) < \lambda)$$

$$PTS = \{0, DIM/2\}$$

There are ways to optimize the search for the optimal sampling template dimensions DIM; however, brute force search is fast enough, so no such optimizations are necessary.

Summary of Processes

Figure 5:
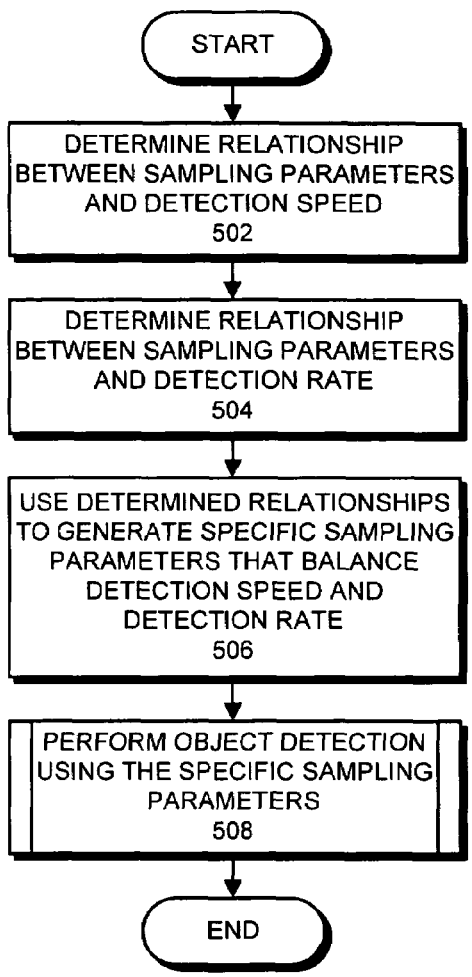
FIG. 5 presents a flow chart illustrating the process of generating sampling parameters in accordance with an embodiment of the present invention.

Referring to the flow chart in FIG. 5, the process of generating sampling parameters can be summarized as follows. First, the system determines a relationship between the sampling parameters and detection speed for a given object detector (and possibly for a specific class of images) (step 502). As was described above, the sampling parameters can include: (1) a sampling function, which determines locations within the image to sample; and (2) a refinement threshold, wherein if a response obtained while sampling a given location exceeds the refinement threshold, a localized search for the object is performed in the vicinity of the given location.

Next, the system determines a relationship between the sampling parameters and detection rate for the given object detector (step 504).

The system then uses the determined relationships to generate specific sampling parameters that strike a desired balance between detection speed and detection rate (step 506). As mentioned above, some application might want to maximize detection speed for a fixed detection rate, while other applications maximize detection rate for a fixed detection speed.

Finally, the system uses the specific sampling parameters to perform the object detection process (step 508).

Figure 6:
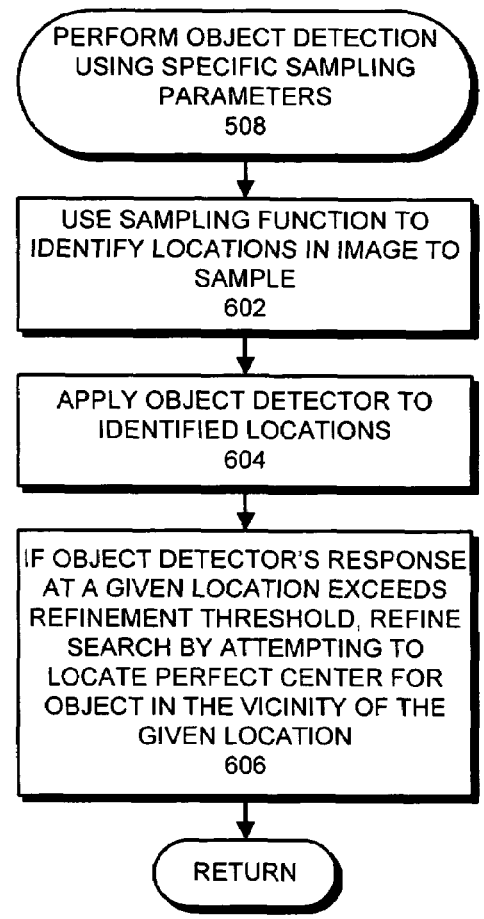
FIG. 6 presents a flow chart illustrating the object detection process in accordance with an embodiment of the present invention.

This object detection process is described in more detail in the flow chart illustrated in FIG. 6. First, the system uses the sampling function to identify locations in the image to sample (step 602). Next, the system applies the object detector to the identified locations (step 604). Finally, if the object detector's response at a given location exceeds the refinement threshold, the system refines the search by using the detecting in an attempt to locate the perfect center of the object in the vicinity of the given location (step 606).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for detecting an object in an image, comprising:
   determining a relationship between sampling parameters and a detection rate for an object detection process;
   determining a relationship between the sampling parameters and a detection speed for the object detection process;
   wherein the sampling parameters include:
      a sampling function, which determines locations within the image to sample; and
      a refinement threshold, wherein if a response obtained while sampling a given location exceeds the refinement threshold, a localized search for the object is performed in the vicinity of the given location;
   using the determined relationships to generate specific sampling parameters; and
   performing the object detection process, wherein the object detection process uses the sampling parameters to sample locations in the image, wherein a sampling process is used to refine the search for the object by identifying locations that respond to an object detector and are hence likely to be proximate to an instance of the object.

2. The method of claim 1, wherein generating the specific sampling parameters involves balancing detection speed and detection rate.

3. The method of claim 2, wherein generating the specific sampling parameters involves maximizing detection speed for a fixed detection rate.

4. The method of claim 2, wherein generating the specific sampling parameters involves maximizing detection rate for a fixed detection speed.

5. The method of claim 1, wherein the object detection process involves:
   using the sampling function to identify locations in the image to sample; and
   applying the object detector to the identified locations;
   wherein if the object detector's response at a given location exceeds the refinement threshold, the method further comprises refining the search by attempting to locate a perfect center for the object in the vicinity of the given location.

6. The method of claim 1, wherein the sampling function is determined based upon empirical results obtained while using the object detector.

7. The method of claim 1, wherein the refinement threshold is determined based upon empirical results obtained while using the object detector.

8. A computer-readable storage medium storing instructions that when executed by a computer cause the computer to perform a method for detecting an object in an image, the method comprising:
   determining a relationship between sampling parameters and a detection rate for an object detection process;
   determining a relationship between the sampling parameters and a detection speed for the object detection process;

wherein the sampling parameters include:
  a sampling function which determines locations within the image to sample; and
  a refinement threshold wherein if a response obtained while sampling a given location exceeds the refinement threshold a localized search for the object is performed in the vicinity of the given location;
using the determined relationships to generate specific sampling parameters; and
performing the object detection process, wherein the object detection process uses the sampling parameters to sample locations in the image, wherein a sampling process is used to refine the search for the object by identifying locations that respond to an object detector and are hence likely to be proximate to an instance of the object.

9. The computer-readable storage medium of claim 8, wherein generating the specific sampling parameters involves balancing detection speed and detection rate.

10. The computer-readable storage medium of claim 9, wherein generating the specific sampling parameters involves maximizing detection speed for a fixed detection rate.

11. The computer-readable storage medium of claim 9, wherein generating the specific sampling parameters involves maximizing detection rate for a fixed detection speed.

12. The computer-readable storage medium of claim 8, wherein the object detection process involves:
  using the sampling function to identify locations in the image to sample; and
  applying the object detector to the identified locations;
  wherein if the object detector's response at a given location exceeds the refinement threshold, the method further comprises refining the search by attempting to locate a perfect center for the object in the vicinity of the given location.

13. The computer-readable storage medium of claim 8, wherein the sampling function is determined based upon empirical results obtained while using the object detector.

14. The computer-readable storage medium of claim 8, wherein the refinement threshold is determined based upon empirical results obtained while using the object detector.

15. An apparatus that detects an object in an image, comprising:
  a determination mechanism configured to,
    determine a relationship between sampling parameters and a detection rate for an object detection process, and to determine a relationship between the sampling parameters and a detection speed for the object detection process;
  wherein the sampling parameters include:
    a sampling function, which determines locations within the image to sample; and
    a refinement threshold, wherein if a response obtained while sampling a given location exceeds the refinement threshold, the object detection mechanism is configured to perform a localized search for the object in the vicinity of the given location;
  a parameter generation mechanism configured to use the determined relationships to generate specific sampling parameters; and
  an object detection mechanism configured to perform the object detection process, wherein the object detection process uses the sampling parameters to sample locations in the image, wherein a sampling process is used to refine the search for the object by identifying locations that respond to an object detector and are hence likely to be proximate to an instance of the object.

16. The apparatus of claim 15, wherein while generating the specific sampling parameters, the parameter generation mechanism is configured to balance detection speed and detection rate.

17. The apparatus of claim 16, wherein the parameter generation mechanism is configured to maximize detection speed for a fixed detection rate.

18. The apparatus of claim 16, wherein the parameter generation mechanism is configured to maximize detection rate for a fixed detection speed.

19. The apparatus of claim 15, wherein the object detection mechanism is configured to,
  use the sampling function to identify locations in the image to sample, and to
  apply the object detector to the identified locations; and
  wherein if the object detector's response at a given location exceeds the refinement threshold, the object detection mechanism is configured to refine the search by attempting to locate a perfect center for the object in the vicinity of the given location.

20. The apparatus of claim 15, wherein the sampling function is determined based upon empirical results obtained while using the object detector.

21. The apparatus of claim 15, wherein the refinement threshold is determined based upon empirical results obtained while using the object detector.

* * * * *